3,383,442
METHOD AND APPARATUS FOR MANUFACTURING DECORATIVE THERMOPLASTIC COVERING MATERIAL
George Robert Mountain, Somerset, N.J., assignor to Johns-Manville Corporation, New York, N.Y., a corporation of New York
Filed Mar. 18, 1965, Ser. No. 440,687
12 Claims. (Cl. 264—74)

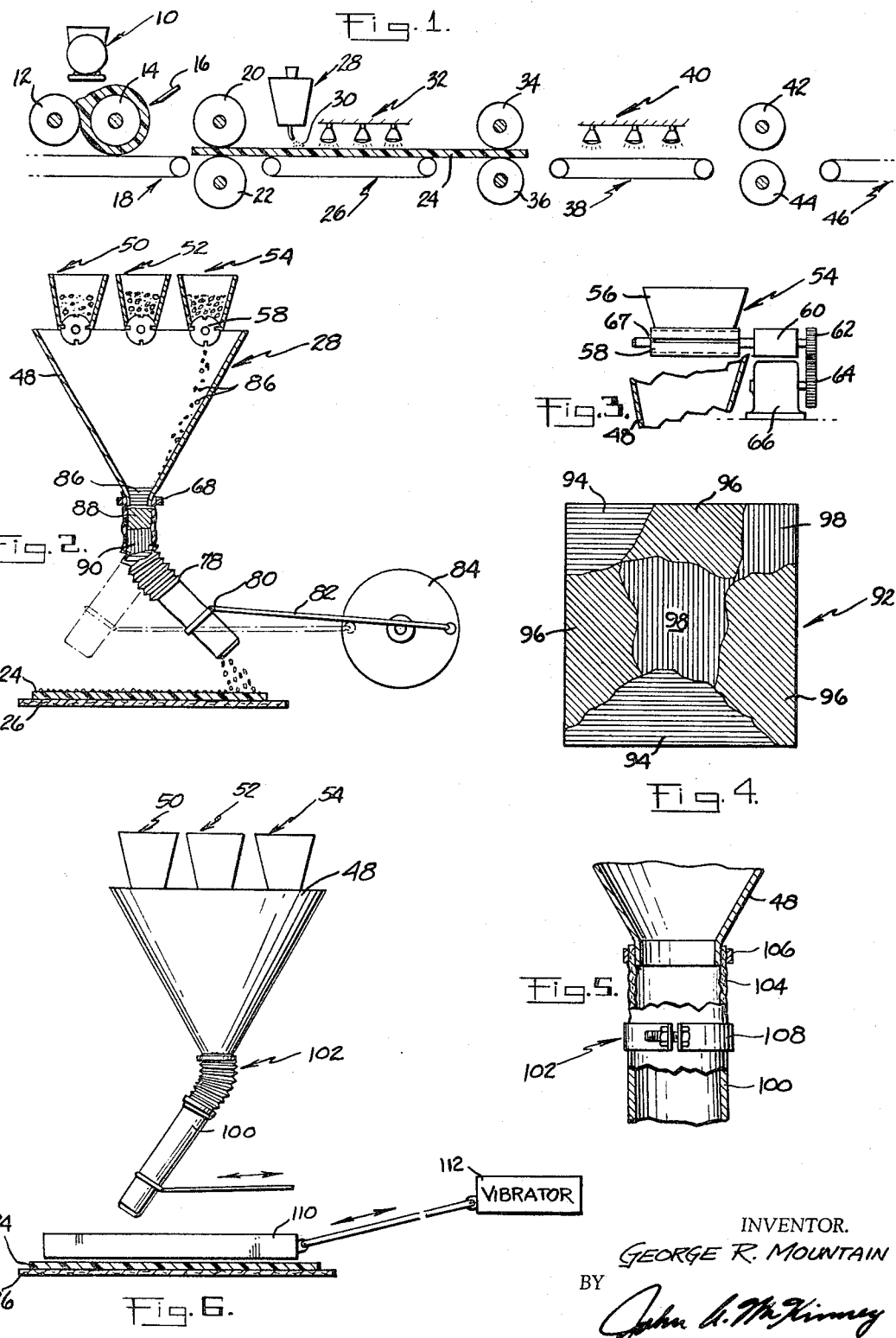

ABSTRACT OF THE DISCLOSURE

Thermoplastic particles are collected in groups of contrasting appearance and are deposited on a moving sheet so that the particles of each group are substantially segregated from particles of other groups. Heat and pressure are applied to bond the particles together to form a decorative thermoplastic sheet of covering material.

---

This invention relates to decorative thermoplastic covering material and, more particularly, to a method and apparatus for manufacturing decorative thermoplastic floor and wall covering material having a novel surface pattern.

Thermoplastic material is well established as a decorative floor and wall covering material capable of adequately withstanding traffic and wear. The present trend is to such covering material which displays different, novel, more attractive patterns and designs, and the flooring industry is consequently continually attempting to develop material which will appeal to the market.

Thermoplastic floor material generally is comprised of resin, plasticizer and pigment. Filler material is incorporated in the resinous material when the product is manufactured on a relatively fast, continuous production line utilizing milling and calendering rolls in order to impart to the material properties which permit calendering, while fillers ordinarily are not used in the so called "all vinyl" products which are not calendered but are subjected to the action of a flat bed press. While many different, pleasing, decorative appearances can be produced by means of the press method of manufacture, these products are more expensive than those produced in the continuous milling and calendering operation. It is advantageous, therefore, to be able to manufacture thermoplastic covering material having a novel and highly pleasing appearance on a continuous calendering roll manufacturing line, particularly if the product either resembles a design which is manufactured by the press process, or if it presents a completely unique appearance as compared to known patterns.

In manufacturing thermoplastic covering material on a continuous line utilizing calender rolls, the composition, which, as mentioned above usually comprises resin, plasticizer, pigment and filler, is fed to a roller mill and the resulting sheet is stripped from the mill and fed through calendering rolls in the presence of sufficiently high temperatures to cause the materials to fuse together, thus producing a sheet of desired thickness. By adding small amounts of different colored thermoplastic particles and either permitting such particles to be streaked by the action of the calendering rolls or to remain in relatively discrete form, different surface appearances are obtained. Often, such sheets are formed into small particles of varying colors which are subsequently used to form sheets of variegated color. Designs on thermoplastic sheets manufactured by a calendering operation generally have been limited to sheets of a base color having different colors streaked or randomly located on the surface, or to sheets of no particular base color but having small areas of color, corresponding in size generally to the size of the chips randomly dispersed over the surface of the sheet. It would be desirable to be able to produce designs of pleasing appearance which are a departure from the usual designs associated with calendered thermoplastic material.

It is an object of the present invention to provide a thermoplastic covering material having a novel and highly pleasing surface appearance.

Another object of this invention is to provide a method for controlling and segregating thermoplastic particles of contrasting appearance applied to the surface of a base sheet.

A further object of the invention is to provide a method of applying colored thermoplastic particles to a base sheet of material in such manner that a random pattern of large, substantially segregated areas of different colors are produced.

Another object is to provide apparatus for distributing thermoplastic particles in a controlled manner in order to segregate particles of contrasting appearance from each other in relatively large, substantially segregated areas, which apparatus can be installed in present manufacturing lines without requiring extensive changes.

In order to accomplish the above objects the invention broadly comprises a method and apparatus for depositing successive groups or quantities of thermoplastic particles across the width of a base sheet, each successive group comprising particles of different type or color than the particles in the adjacent group deposited.

The nature of the invention will be more fully understood and other objects may become apparent when the following detailed description is considered in connection with the accompanying drawings, wherein:

FIG. 1 is a diagrammatic representation of a thermoplastic covering material manufacturing line incorporating the present invention;

FIG. 2 is an enlarged end view, shown partially in section, of an illustrative thermoplastic particle distributing apparatus;

FIG. 3 is a side elevation of a typical granule distributing means used in the apparatus shown in FIG. 2;

FIG. 4 is a plan view of a floor tile pattern capable of being produced by the present invention;

FIG. 5 is a partial enlarged sectional view illustrating a modified construction of the lower portion of the distributing apparatus of FIG. 2; and FIG. 6 is a view generally similar to that of FIG. 2, but illustrating a modified apparatus for distributing thermoplastic particles.

Referring to FIG. 1, according to one possible method of producing the pattern of the present invention, the ingredients of a filled resinous composition, such as, for example, vinyl resin, plasticizer, pigment and asbestos fibers, are introduced into a mixer 10 which mixes the ingredients and deposits the resulting mixture between milling rolls 12 and 14. The composition is worked by the rotating milling rolls for a predetermined time, after which a doctor blade 16 is actuated and the material is stripped from the roll 14. The resulting slab of thermoplastic composition falls to the conveyor 18 which delivers the slab to the calender rolls 20, 22 which press the slab into a sheet 24 of predetermined thickness. As the sheet leaves the calender rolls 20, 22 it becomes supported on and is moved by the conveyor 26.

Downstream from the first pair of calender rolls 20, 22 a thermoplastic particle applicator device 28 deposits chips or particles 30, in a manner to be described in more detail hereinafter, over the surface of the sheet 24, after which both the particles 30 and the sheet 24 are subjected to heat from a bank of heaters 32. The temperature of the sheet and the layer of particles 30 is raised to a level which in combination with the pressure applied by a second set of calendering rolls 34 and 36 fuses the particles or chips to each other and to the sheet. Thereafter, another conveyor 38 transports the material beneath a second bank of heaters 40 which maintain the material in relatively soft condition, and the material then passes through a third set of calender rolls 42, 44 which press the material to final thickness and provide it with a smooth surface finish. Then the material is transported by conveyor 46 to further manufacturing stations for other operations such as trimming and packaging. Since these further operations are of no importance to the present invention they have not been shown.

Referring to FIG. 2, the particle distributing apparatus 28 is shown handling particles of three different types, i.e., particles which differ in appearance from each other by means of different colors or other contrasting appearances. The apparatus 28 comprises a trough or funnel 48 into which the particles are dropped and which serves to direct them toward the outlet. Mounted at the top of the funnel 48 are three smaller particle distributors 50, 52 and 54. The granules of each different type are fed into separate distributors and are dropped from their distributor in timed relation to the other distributors so that at any one time only one of the distributors 50, 52 and 54 is depositing granules. This can be accomplished in any suitable manner such as, for example, by the arrangements illustrated in FIG. 3. In the FIG. 3 arrangement the distributor 54 is illustrated as being comprised of a trough or funnel 56 for containing the particles fed thereto, and the mouth of the funnel is blocked by a roller 58 mounted for rotation about a horizontally disposed axis. The roller 58 is driven by the output shaft of an indexing unit 60 which is driven through gears 62 and 64 by a continuously driven motor 66. The indexing unit 60 may take any convenient form such as a combination clutch and brake unit, in which normally the brake is on and the clutch is disengaged but upon receiving an electrical impulse the clutch is engaged and the brake is taken off. The electrical impulse may be supplied by any suitable means such as, for example, by commercially available electrical timing devices.

When the roller 58 is at rest, particles cannot escape from the trough 56 because the roller 58 blocks the outlet of the trough. The roller 58 has longitudinally extending grooves 67 spaced about its periphery which grooves become filled with particles when located within the trough area. As the filled grooves move outside the trough area upon rotation of the roller, the particles in the grooves are deposited into the trough 48 of the distributor 28. While this is one illustrative means of depositing particles from the units 50, 52 and 54 in timed relation so that only one unit is depositing particles at any one time, obviously there are other arrangements which would function equally as well and which may be employed.

Referring back to FIG. 2, connected to the outlet of the trough 48, as by a suitable clamping arrangement 68, is a flexible hose 78. The hose may be made of any suitable material such as fabric or corrugated plastic. Pivotally connected to a clamp 80 located adjacent the lower extremity of the hose 78 is a rod or cam follower 82, the other end of which is pivotally connected to a cam wheel 84. When the wheel 84 rotates the rod 82 reciprocates the end of the hose 78 from one end of the thermoplastic sheet 24 to the other, thereby distributing thermoplastic particles over the surface of the sheet as the sheet moves along the manufacturing line.

Granules 86 are illustrated in FIG. 2 as being deposited from the granule distributor 54 over the upper surface of an accumulation of granules 88, previously deposited from the distributor 52, which latter granules in turn had been deposited over the upper surface of an accumulation of granules 90 deposited from the distributor 50. By operating the distributors 50, 52, 54 in timed relation to each other the particles of different colors are deposited in separate accumulations so that as they are deposited on the thermoplastic sheet 24 a group of particles of one color will be deposited in a relatively large, substantially segregated area, followed immediately by a group of different colored particles, also deposited over a relatively large area but substantially segregated from the particles of contrasting appearance.

Referring to FIG. 4, an exemplary floor tile 92 produced according to the present invention is illustrated. Surface areas 94 are indicated as being blue in color, areas 96 are indicated as being green, while areas 98 are indicated as being red. It can be seen that each area is relatively large, the tile commonly being produced in either 9" by 9" size or 12" by 12" size. Each area of color is substantially segregated from neighboring different colored areas and the effect is a controlled random pattern. There may be some slight overlapping or intermixing of the granules of adjacent areas at the borders between the areas since it is inevitable that at least a few granules from each group will intermix. This is not detrimental ot the appearance of the tile, however, since the transition between one group of colors and the next group is smoothly accomplished in this manner. While described thus far with respect to the use of three different colors of thermoplastic particles, the invention of course is not limited to this particular number nor to particles which are different from each other only in color. For example, one group of particles may comprise a mixture of various colors of granules, while the other groups may comprise different mixtures of colors, so that while the same color granule may appear in each group the mixture of different colors in one group contrasts with the mixture of colors in a neighboring group to provide the desired contrasting effect.

Referring to FIG. 5, a modified arrangement of an outlet hose is illustrated. Instead of a flexible hose connected to the distributor funnel 48 in the manner illustrated in FIG. 2, a rigid tube 100 is connected by a flexible connection 102 to the trough or funnel 48. The flexible connection may take the form illustrated in FIG. 5 which comprises a short length of tubular fabric 104 clamped to the end portion of the funnel 48 by clamp 106 and secured to the upper end portion of the tube 100 by clamp 108. In this manner the outlet end of the tube 100 may be reciprocated across the width of the thermoplastic sheet with complete freedom of movement due to the flexibility of the fabric 104. It should be understood that other types of flexible connections could also be employed in addition to the one illustrated in FIG. 5.

Referring now to FIG. 6, a modified arrangement for distributing granules to the thermoplastic sheet 24 is illustrated. In the illustrated construction a trough 48 with the distributors 50, 52, and 54 mounted at the mouth thereof is provided and the tube 100 is shown as being reciprocated across the width of the conveyor 26. Instead of depositing the granules directly on the surface of the thermoplastic sheet 24, however, the granules are deposited first into a vibrating pan 110 extending completely across the width of the sheet. The pan 110 may be vibrated by any suitable well known vibrating means and sloped toward the conveyor to deposit granules fed thereto on the moving sheet 24. In operation, granules are deposited from the reciprocating outlet end of the tube 100 into the vibrating pan 110 in segregated groups of contrasting colors, and the granules then move toward the outlet end of the pan and are deposited in segregated groups over the surface of the sheet 24. This arrangement provides for the areas of similar granules to be more irregula in outline than is usually obtained by distibuting particles directly from the outlet tube to the sheet.

It should be understood that the thermoplastic particles need not be distributed in such density as to completely hide the base thermoplastic sheet but may permit the sheet to show through spaces between the particles.

While not specifically illustrated, the type of granule distribution described above may also be employed in distributing chips directly on a conveyor surface rather than on the surface of a thermoplastic sheet. Subsequently, through the use of calender rolls, the chips can be consolidated into a thermoplastic sheet, without being elongated or distended to any substantial degree so that the final product carries the discrete areas of color throughout the thickness of the sheet. The surface appearance of such a sheet would be similar to that produced by depositing a very thin layer of small particles on the surface of a base thermoplastic sheet and subsequently consolidating and fusing the chips together and to the sheet. As is well known in the art, in manufacturing a sheet by the "chip process," i.e., without milling the particles in order that the particles may substantially retain their form in the final product, the particles should be heated prior to being deposited on the conveyor. This is in contrast to the usual manner of applying thermoplastic particles to the surface of a sheet, since in that case the particles would be relatively cool as compared to the temperature of the base thermoplastic sheet. As can be readily understood, the manner of distributing the particles described above can be utilized with both processes since the types of chips used or their temperatures would not change the basic concept of the invention.

It is to be understood that variations and modifications of the present invention may be made without departing from the spirit of the invention. It also is to be understood that the scope of the invention is not to be interpreted as limited to the specific embodiment disclosed herein, but only in accordance with the appended claims, when read in the light of the foregoing disclosure.

What I claim is:

1. In the manufacture of thermoplastic covering material, the steps of:
   (a) depositing a first group of relatively small thermoplastic particles on a support sheet over a first relatively large area the width of which is less than the width of the support sheet,
   (b) depositing a second group of relatively small thermoplastic particles on the support sheet over a second relatively large area adjacent the first group of particles at least a portion of the second relatively large area being located between at least a portion of the first relatively large area and a side of the support sheet,
   (c) the first group of particles contrasting in appearance with the second group of particles,
   (d) heating the particles to soften them to permit the particles to fuse under sufficient pressure, and
   (e) applying sufficient pressure to the particles to cause them to fuse together.

2. A process for manufacturing thermoplastic covering material as recited in claim 1, including the additional step of depositing at least one more group of thermoplastic particles on the support sheet over a third relatively large area adjacent the first and second groups of particles and contrasting in appearance with the first and second groups of particles.

3. A process for manufacturing thermoplastic covering material as recited in claim 1, wherein each group of particles is comprised of different colored particles, each group as a whole contrasting in appearance with the other group.

4. In a process for manufacturing thermoplastic covering material, the steps of:
   (a) continuously depositing relatively small thermoplastic particles across the width of a thermoplastic sheet of material,
   (b) the particles so deposited being arranged in relatively large groups on the surface of the thermoplastic sheet,
   (c) each group of particles contrasting in appearance with an adjacent group of particles and at least a portion of each group of particles being between at least a portion of an adjacent group of particles and a side of the sheet, and
   (d) the individual particles of each group of particles being substantially segregated from the individual particles of adjacent groups of particles.

5. In a process for manufacturing thermoplastic covering material, the steps of:
   (a) continuously moving a sheet of thermoplastic material,
   (b) providing groups of relatively small thermoplastic particles of one color,
   (c) providing groups of relatively small thermoplastic particles of a contrasting color,
   (d) continuously depositing the groups of one color of particles adjacent groups of a contrasting color of particles across the width of the sheet so that generally the width of each group is less than the width of the sheet,
   (e) the particles in the groups so deposited being substantially segregated from the particles in adjacent groups of particles, and
   (f) applying sufficient pressure on the thermoplastic particles and thermoplastic sheet in the presence of sufficient heat to cause the particles to fuse together and to the thermosplastic sheet.

6. A process for manufacturing thermoplastic covering material as recited in claim 5, wherein at least three contrasting groups of colored thermoplastic particles are alternately applied to the surface of the thermoplastic sheet.

7. In a process for manufacturing thermoplastic covering material, the steps of:
   (a) continuously moving a base sheet of material,
   (b) collecting groups of relatively small thermoplastic particles in a container mounted for movement across the width of the moving sheet,
   (c) at least two different types of groups of particles being collected in the movable container, one group containing particles which, as a whole, contrast with the particles, as a whole, of the other group,
   (d) the different groups being alternately arranged, one above the other, in the container,
   (e) moving the container across the width of the sheet while depositing the particles therefrom over the surface of the sheet, and
   (f) consolidating the particles under heat and pressure to fuse the particles together, thereby providing a thermoplastic sheet having a surface comprised of relatively large, contrasting, adjacent areas substantially segregated from each other.

8. A process for manufacturing thermoplastic covering material as recited in claim 7, comprising the additional steps of collecting particles of each type in further separate containers and depositing the particles into the movable container in intermittent timed relationship to cause the particles of each different type to be alternately vertically arranged in the movable container.

9. In a process for manufacturing thermoplastic covering material, the steps of:
   (a) continuously moving a base sheet of material,
   (b) collecting substantially segregated groups of relatively small thermoplastic particles in a container extending across the width of the sheet,
   (c) each group of particles presenting a different appearance from the other adjacent groups of particles,
   (d) depositing the particles from the container on the surface of the base sheet as the sheet moves beneath the container so that generally the particles of each group extend across the sheet a distance less than the width of the sheet, (e) continually collecting additional groups of particles in the container, and
(f) consolidating the particles deposited on the base sheet under heat and pressure.

10. In apparatus for manufacturing thermoplastic sheets of material:
(a) a container for receiving thermoplastic particles therein,
(b) means depositing adjacent groups of thermoplastic particles in the container, each group contrasting in appearance with the adjacent group and remaining substantially segregated therefrom,
(c) means for progressively moving the container across the width of a longitudinally moving sheet, and
(d) means for depositing the groups of particles over the surface of the moving sheet of material as the container moves thereacross so that the particles of adjacent roofs are substantially segregated and each group generally extends across the sheet a distance less than the width of the sheet.

11. In apparatus for manufacturing thermoplastic sheets of material:
(a) a container mounted above a continuously moving sheet of material and extending across the width of the sheet,
(b) means for depositing groups of thermoplastic particles in the container, each group contrasting in appearance with the adjacent group and remaining substantially segregated therefrom, and
(c) means for depositing the groups of particles from the container onto the surface of the continuously moving sheet so that the particles of adjacent groups are substantially segregated and each group generally extends across the sheet a distance less than the width of the sheet.

12. Apparatus for manufacturing thermoplastic covering material as recited in claim 11, including additionally means for continually depositing groups of particles in the container to replace the groups of particles deposited from the container.

References Cited
UNITED STATES PATENTS

| | | | |
|---|---|---|---|
| 2,404,207 | 7/1946 | Ball | 264—122 |
| 2,460,605 | 2/1949 | Soissa | 222—14 |
| 2,654,912 | 10/1953 | Burchenal | 264—77 |
| 3,012,901 | 12/1961 | Reese | 117—21 |

ALEXANDER H. BRODMERKEL, *Primary Examiner.*
DONALD J. ARNOLD, *Examiner.*
T. MORRIS, *Assistant Examiner.*